United States Patent
Chung et al.

(10) Patent No.: US 9,417,752 B2
(45) Date of Patent: Aug. 16, 2016

(54) PATTERN ADJUSTING METHOD FOR TOUCH SENSOR AND ELECTRONIC DEVICE

(71) Applicant: Acer Incorporated, New Taipei (TW)

(72) Inventors: Hsing-Lung Chung, New Taipei (TW); Chao-Shih Huang, New Taipei (TW); Jian-Wei Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/532,012

(22) Filed: Nov. 4, 2014

(65) Prior Publication Data

US 2015/0193079 A1   Jul. 9, 2015

(30) Foreign Application Priority Data

Jan. 8, 2014  (TW) .............................. 103100673 A

(51) Int. Cl.
*G06F 3/00* (2006.01)
*G06F 3/045* (2006.01)
*G06F 3/044* (2006.01)

(52) U.S. Cl.
CPC ................ *G06F 3/045* (2013.01); *G06F 3/044* (2013.01); *G06F 2203/04103* (2013.01)

(58) Field of Classification Search
CPC ........... G06F 3/041; G06F 1/00; G06F 3/044; G06F 3/017; G06F 3/0488; G09G 5/00; G06T 5/00
See application file for complete search history.

(56) References Cited

U.S. PATENT DOCUMENTS 8,310,459 B2 *  11/2012  Nurmi ..................... G06F 3/041
                                                                345/1.1
2011/0141045 A1 *  6/2011  Choi ..................... G06F 1/1626
                                                                345/173

* cited by examiner

*Primary Examiner* — Michael Faragalla
(74) *Attorney, Agent, or Firm* — Jianq Chyun IP Office

(57) ABSTRACT

A pattern adjusting method of a touch panel and an electronic device are provided. The pattern adjusting method is used for determining a sensor pattern of a plurality of touch sensors on a touch panel and includes the following steps. Panel information of the touch panel is collected. An original layout result of the touch sensors is generated according to the panel information and a predefined sensor information, wherein the predefined sensor information includes an original sensor pattern. A non-covering area of the touch sensors on the touch panel is obtained by analyzing the original layout result. At least one extending area is generated by extending a covering area of the original sensor pattern to the non-covering area in order to obtain a final sensor pattern having at least one extending area.

10 Claims, 6 Drawing Sheets

PATTERN ADJUSTING METHOD FOR TOUCH SENSOR AND ELECTRONIC DEVICE

CROSS-REFERENCE TO RELATED APPLICATION

This application claims the priority benefit of Taiwan application serial no. 103100673, filed on Jan. 8, 2014. The entirety of the above-mentioned patent application is hereby incorporated by reference herein and made a part of this specification.

BACKGROUND OF THE INVENTION

1. Field of the Invention

This invention relates to touch sensing technology, specifically to a pattern adjusting method for a touch sensor and an electronic device.

2. Description of Related Art

As the technology development of the touch panel, the touch panel is widely used in the monitors of electronic devices, such as the mobile phone, the notebook or the tablet. The touch panel provides the users more convenient ways to input data or operate the system, and it makes the user interface more user-friendly and convenient.

Generally, the touch panel has a plurality of touch sensors disposed on the substrate. When the finger or a touch input apparatus contacts the touch panel, the sensing magnitude sensing by the touch sensors changes. Then, the touch control chip connecting the touch sensors judges the location where the user contacts physically according to the sensing magnitude sensing by the touch sensors. However, due to convenience of operation and usage, the size of the head of the stylus is designed to become much smaller and smaller. As a result, the amount of the touch sensors which could sense the variation of the sensing magnitude causing by the stylus decreases, so that the accuracy of the touch sensing and detecting decreases.

In a known method, although it improves the accuracy of the touch sensing by shrinking the size of the touch sensor and increasing the sensing channels, the touch control chip of the touch panel needs to be replaced in response to the different number of the sensing channels. This results in raising the manufacturing cost of the touch panel. Moreover, the size of the touch sensor is limited to the number of sensing channels of the touch control chip or the characteristic of the touch sensor; it can not be shrunk unlimitedly. Therefore, it is the main objective for the skilled in the art to find a solution to the above problem under the condition that finds a trade-off between the cost and the accuracy of touch sensing and keeps the compatibility with present products.

SUMMARY OF THE INVENTION

Accordingly, a pattern adjusting method of a touch sensor and an electronic device of the invention are provided to adjust the sensing area of each touch sensor on the touch panel so that the accuracy of touch sensing is getting higher.

A pattern adjusting method of a touch sensor for determining a pattern of a plurality of touch sensors on a touch panel is provided, and the pattern adjusting method includes the following steps. Panel information of the touch panel is collected. An original layout result of the touch sensors is generated according to the panel information and a predefined sensor information, wherein the predefined sensor information includes an original sensor pattern. A non-covering area of the touch sensors on the touch panel is obtained by analyzing the original layout result. At least one extending area is generated by extending a covering area of the original sensor pattern to the non-covering area in order to obtain a final sensor pattern having at least one extending area.

From another point of view, an electronic device for determining the sensor pattern of a plurality of the touch sensors on the touch panel is provided. The electronic device includes a storage unit and one or a plurality of processing units. The storage unit records a plurality of modules. One or a plurality of processing units couples to the storage unit to access and execute the module recorded in the storage unit. The module includes an information collecting module, an original configuration module, an analyzing module and an extending module. The information collecting module collects panel information of the touch panel. The original configuration module generates the original layout result of the touch sensors according to the panel information and a predefined sensor information, wherein the predefined sensor information includes an original sensor pattern. The analyzing module obtains a non-covering area of the touch sensors on the touch panel by analyzing the original layout result. At least one extending area is generated by the extending module extending a covering area of the original sensor pattern to the non-covering area in order to obtain a final sensor pattern having at least one extending area.

According to the above descriptions, the embodiment of the invention extends the covering area of the touch sensors by changing the sensor pattern to increase the sensing area of a single touch sensor, so that the accuracy of the contact location judgment is higher. Besides, the invention broadens the sensing area of each touch sensor and reduces sensing area which is not sensed accurately without changing the number of sensing channels of the touch control chip in order that it saves the manufacturing cost and the accuracy of the touch sensing is higher at the same time.

In order to make the aforementioned and other features and advantages of the invention comprehensible, several exemplary embodiments accompanied with figures are described in detail below.

DESCRIPTION OF THE EMBODIMENTS

A touch panel includes a plurality of touch sensors sensing the touch operation of the user, and the touch control chip determines the touch location of the touch operation according to the sensing result of the touch sensors. Generally, if sensing magnitude is detected by more touch sensors, more information is used to locate, so that the accuracy of positioning of the touch point is higher. The invention generates a new sensor pattern through analysis and design based on the characteristics before manufacturing the touch panel and etching. Therefore, it extends the predefined sensor pattern to broaden the sensing area of each touch sensor, so that it reduces some areas which are with low positioning accuracy. In order to understand the invention more fully, the following listed embodiments are examples for implementing the invention.

Figure 1:
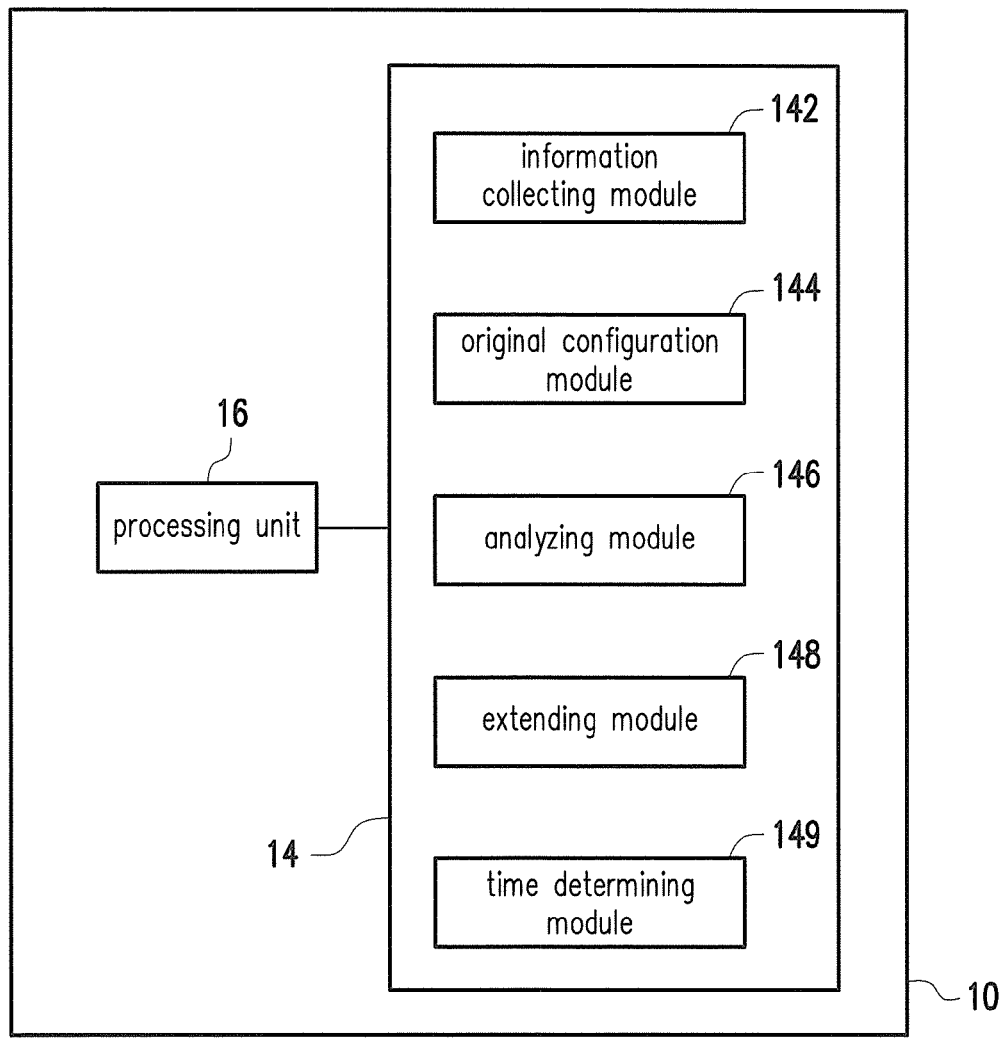
FIG. 1 is a block diagram of an electronic device according to an embodiment of the invention.

FIG. 1 is a block diagram of an electronic device according to an embodiment of the invention. Please refer to FIG. 1, the electronic device 10 of the embodiment is a calculating device having computing functions, for example, a desktop, a notebook, or other calculator structure, wherein the electronic device 10 includes a storage unit 14 and one or a plurality of processing units 16 whose functionalities are described as below.

The storage unit 14, for example, a fixed or movable Random Access Memory (RAM) of any type, Read-Only Memory (ROM), Flash Memory, Hard Disk, or any other similar apparatus or the combinations thereof, is used to record a plurality of modules executing by the processing unit 16, and the modules are loaded into the processing unit 16 to execute the pattern adjusting method of the touch sensor.

The processing unit 16, for example, Central Processing Unit (CPU), or programmable microprocessor of common usage or specific usage, Digital Signal Processor (DSP), programmable controller, Application Specific Integrated Circuits (ASIC), Programmable Logic Device (PLD), or any other similar apparatus or the combinations thereof. The processing unit 16 couples to the storage unit 14 to access and execute the modules recorded in the storage unit 14.

The modules includes an information collecting module 142, an original configuration module 144, an analyzing module 146 and an extending module 148, and the above modules, for example, are computer programs loaded into the processing unit 16 for analyzing and further adjusting the sensor pattern of the touch sensors to determine a better sensor pattern before the etching process of the touch panel. The embodiments are listed as below to explain the steps of the pattern adjusting method of the touch sensor in detail.

It is noted that the touch panel according to the embodiment detects the contact operation of the user, and generates corresponding touch point information according to the sensing contact operation. The contact operation, for example, is that a user contacts the touch panel by an input tool (such as a finger or a stylus) to send a command through the touch panel to a device installed with the touch panel. In order to generate corresponding touch point information responded to the contact of the user, the touch panel includes a plurality of touch sensors.

Moreover, the touch panel is a resistive touch panel or a capacitive touch panel, and the invention is not limited to it. Among them, different kinds of touch panels have different kinds of touch sensors, for example, the resistive touch panel detecting the contact point by the resistance value generating by the user contacting the touch panel, while the capacitive touch panel detecting the contact point by the capacitance value generating by the user contacting the touch panel. For example, the touch sensor of the capacitive touch panel includes the sensing electrodes sensing the capacitor. The material of the sensing electrodes, for example, is Indium Tin Oxide (ITO). In the embodiment, the pattern of the sensing electrodes is viewed as the pattern, and the sensing area of the touch sensor is different with the variety of the patterns.

Further, the touch sensors according to the embodiment are disposed on the channel and connect in series to form a plurality of sensing strings. When the finger of the user is placed on the touch panel, the sensing electrodes under the finger and the nearby sensing electrodes sense the change, such as the variation of capacitance value or other sensing parameters because of the contact of the finger. As a result, the touch control chip of the touch panel knows the related location information of the touch point according to sensing result of the sensor strings. The structure of the sensing strings of the touch panel according the embodiment is single-layer or double-layer.

Figure 2:
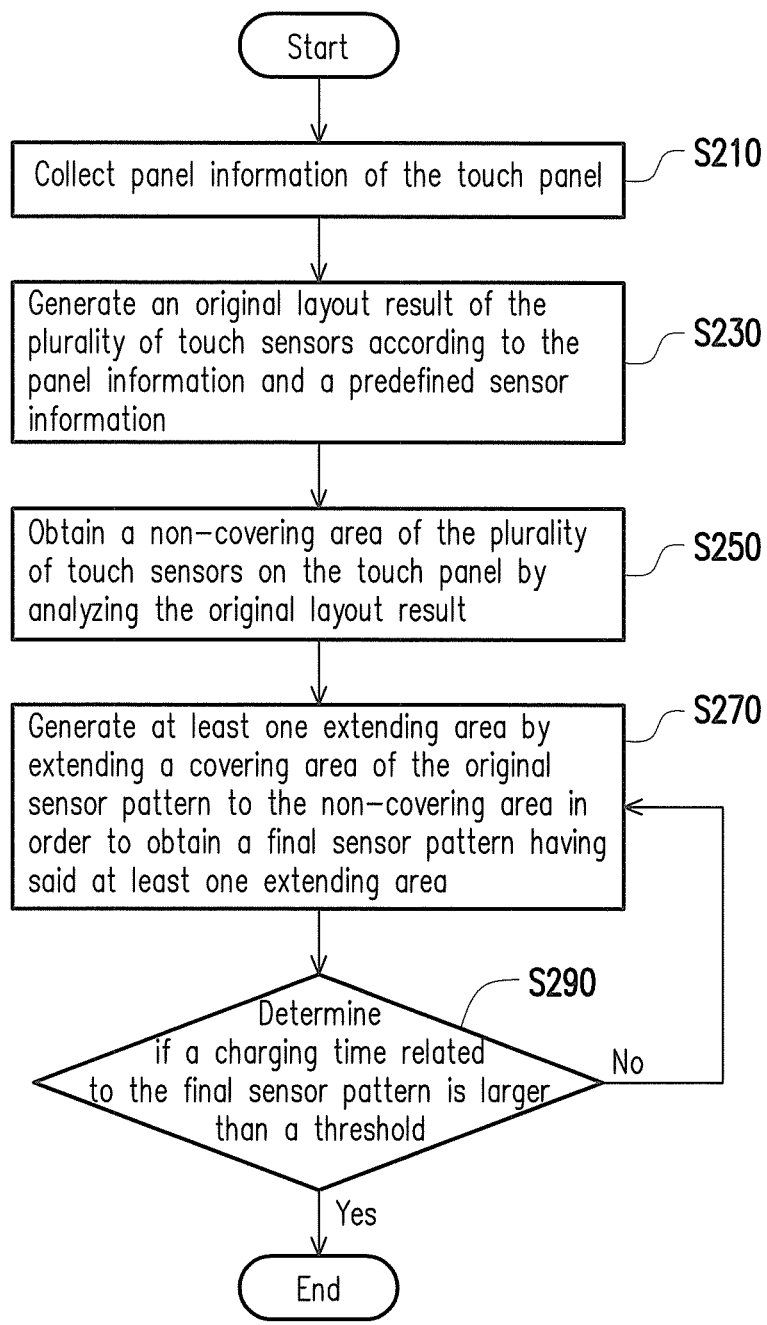
FIG. 2 is a flowchart of a pattern adjusting method of a touch sensor according to an embodiment of the invention.

FIG. 2 is a flowchart of a pattern adjusting method of the touch sensor according to an embodiment of the invention. Please refer to FIG. 2, it is illustrated the steps of the pattern adjusting method of the touch sensor of the invention in detail with each component of the electronic device 10.

Firstly, in the step S210, the information collecting module 142 collects the panel information of the touch panel. The touch panel according to the embodiment includes a touch region and a plurality of sensing channels, and the touch sensor is disposed on the sensing channels to form a plurality of sensing strings. The panel information includes a dimension of the touch region and the number of sensing channels of the sensing channels. In the step S230, the original configuration module 144 generates the original layout result of the touch sensors according to the panel information and a predefined sensor information, wherein the predefined sensor information includes an original sensor pattern.

More specifically, in an embodiment, the information collecting module 142, for example, collects the dimension of the touch region and the number of sensing channels of the sensing channels. Based on the above description, the touch control chip of the touch panel determines the number of the sensing channels of the touch panel. Hence, when the manufacturer of the touch panel decides the touch control chip, the number of the sensing channels of the touch panel is fixed. Moreover, the manufacturer of the touch panel decides the dimension of the touch region of the touch panel according to the usage or the design requirement.

After, the original configuration module 144 generates the original layout result of the touch sensors according to the panel information and the predefined sensor information. Furthermore, the manufacturer of the touch panel decides the predefined sensor information according to the usage or the design requirement. The predefined sensor information includes design information such as an original sensor pattern, a sensor pitch, a sensor dimension, a charging time of the sensor, and etc. The original sensor pattern, for example, is a diamond pattern, a stripe pattern, or a snowflake pattern, and it is not limited herein. The sensor pitch represents the distance between two adjacent sensors, the sensor dimension representing the size of a single touch sensor, and the charging time of the sensor represents that the time needed for charging the capacitive touch sensor.

Figure 3:
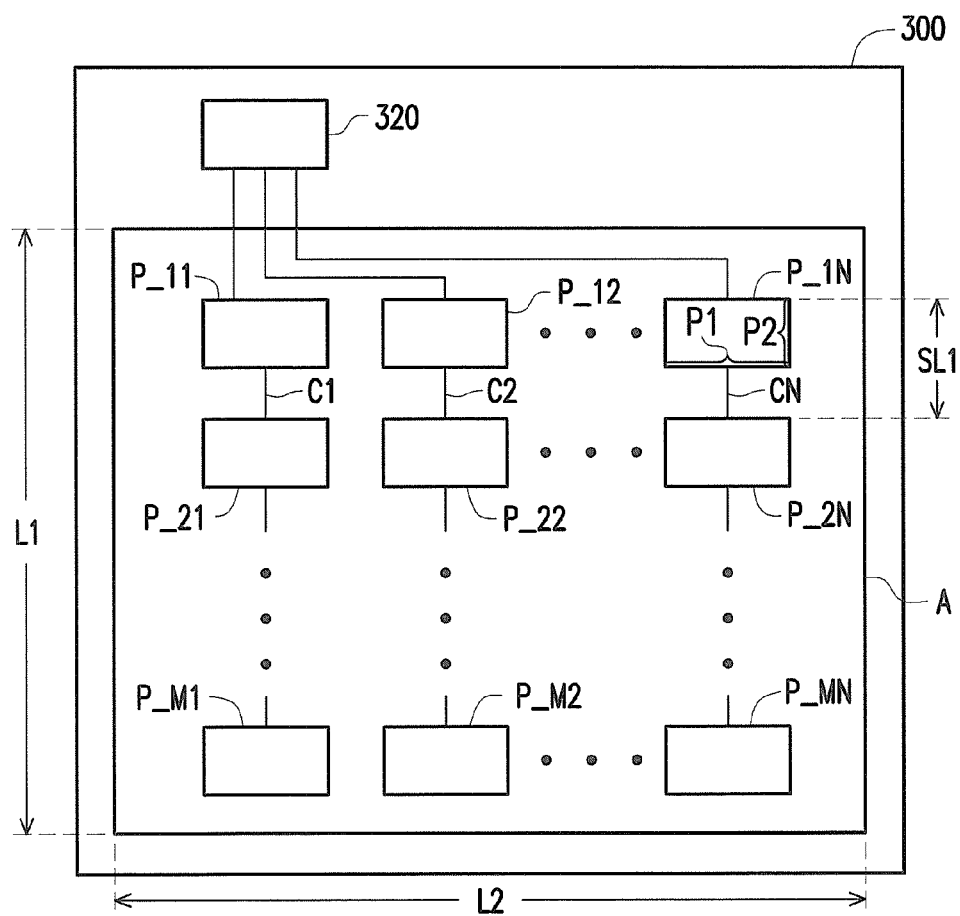
FIG. 3 is a schematic of a touch panel according to an embodiment of the invention.

Therefore, the original configuration module 144 generates the original layout result of the touch sensors according to the panel information and the predefined sensor information. For example, FIG. 3 is a schematic of a touch panel according to an embodiment of the invention. Please refer to FIG. 3. In the example, touch panel 300 includes a touch control chip 320 and a touch region A. The dimension of the touch region A is showed as the FIG. 3, and the touch region A is L1 in width and L2 in length. Moreover, the touch control chip 320 determines the number of channels of the touch panel 300. In the example, the touch panel 300 includes a number of channels N, which represents that the touch panel 300 has N sensing channels, wherein N is a positive integer.

In other words, in the example, the information collecting module 142 collects the panel information including region dimension of region width L1 and region length L2 and channel number N. Besides, in the example, the original sensor pattern is a rectangular pattern, and the pitch between adjacent sensors is the sensor pitch SL1. Moreover, the sensor dimension of the touch sensor is P1 in length and P2 in width.

In the case, the original configuration module 144 generates the original layout result of the touch sensor P_11 to P_MN according to the region width L1 and the region length L2 of the region dimension, the channel number N, the rectangular pattern, the sensor pitch SL1 and the sensor dimension having P1 in length and P2 in width. In the example, the original layout result is showed as the FIG. 3, the touch region includes N sensing channels C1 to CN, and the touch sensors P_11 to P_M1 are disposed on the first channel C1. In this way, the touch sensors P_1N to P_MN are disposed on the Nth channel CN. Note that FIG. 3 is an exemplary example, and it is not used to limit the invention. To sum up, the original configuration module 144 disposes the touch sensors on the touch panel according to the panel information and the predefined sensor information.

Note that if the touch region of the touch panel is larger, the pitch between the channels is larger accordingly because of the limitation of the number of channels of the touch control chip. However, for the size of touch sensor, there are other related limitations so that its size can not be enlarged unlimitedly. For example, for the touch input apparatus of a smaller contact area, the touch sensors on the touch panel sensing the contact of the stylus are fewer so that the accuracy of the touch sensing is lower if the channel number is fewer and the dimension of touch sensor is larger. Therefore, the invention further changes the pattern of the touch sensor according to the non-covering area of the touch sensor.

Back to the flow of FIG. 2, in step S250, the analyzing module 146 obtains a non-covering area of the touch sensors on the touch panel by analyzing the original layout result. In other words, the analyzing module 146 knows the non-covering area not covering by the touch sensors on the touch panel according to present original layout result after the original configuration module 144 finishes the layout of the touch sensors.

Figure 4A:
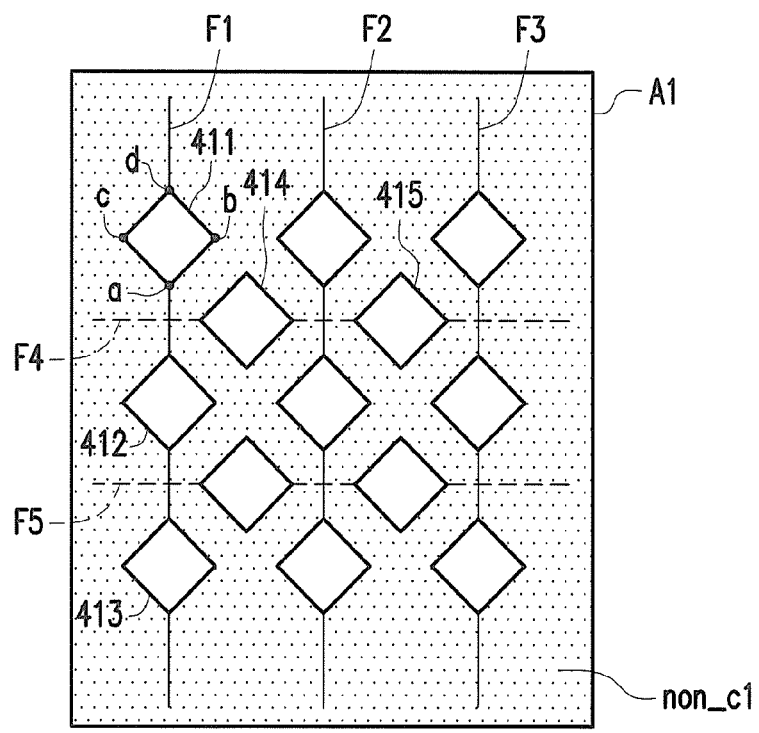
FIG. 4A is an exemplary schematic of analyzing a non-covering area according to an embodiment of the invention.
Figure 4B:
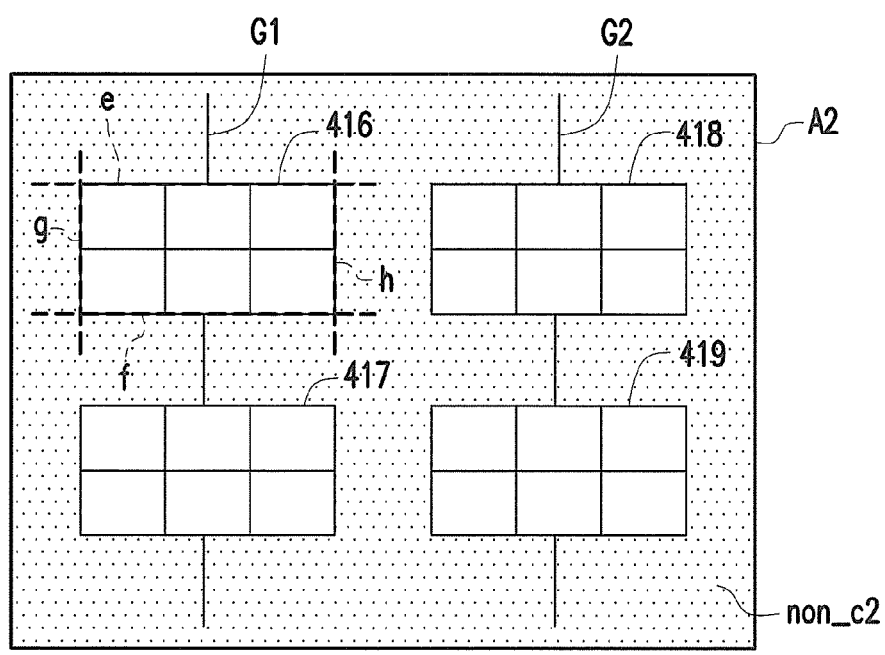
FIG. 4B is an exemplary schematic of analyzing a non-covering area according to an embodiment of the invention.

For example, FIG. 4A and FIG. 4B are exemplary schematics of analyzing a non-covering area according to an embodiment of the invention. Please refer to FIG. 4A. For illustrating the invention more easily, if the original layout result is showed as FIG. 4A, the touch region A1 includes perpendicular sensing channels F1 to F3, parallel sensing channels F4 to F5 and a plurality of touch sensors of the diamond pattern. Moreover, the sensing channel F1 has touch sensors 411t to 413, and the sensing channel F4 has touch sensors 414 to 415. However, the example is showed as FIG. 4A, but FIG. 4A is only an exemplary example, not to limit the invention.

Furthermore, the analyzing module 146, for example, defines the non-covering area by the end points of each touch sensor. As showed in FIG. 4A, the analyzing module 146 records the end points of each touch sensor. For example, the analyzing module 146 records the location information of the end point a, end point b, end point c and end point d of the touch sensor 411. Therefore, the analyzing module 411 knows that the covering area covering by the touch sensor 411 is the diamond region formed by end point a, end point b, end point c and end point d, and the opposite area is the non-covering area not covering by the touch sensor 411. As a result, the analyzing module 146 obtains a non-covering area non_c1 not covering by the touch sensors on the touch panel by jointing every non-covering area of each touch sensor after analyzing the end points of a plurality of touch sensors.

Moreover, in another embodiment, the analyzing module 146 analyzes the non-covering area according to the edge of the touch sensors. Please refer to FIG. 4B. For illustrating the invention more easily, if another original layout result is showed as FIG. 4B, the touch region A2 includes sensing channels G1 to G2 and a plurality of touch sensors in a rectangular pattern. Moreover, the sensing channel G1 has touch sensors 416 to 417, and the sensing channel G2 has touch sensors 418 to 419. However, the example is showed as FIG. 4B, but FIG. 4B is only an exemplary example, not to limit the invention.

Herein, the analyzing module 146, for example, defines the non-covering area by the edge of each touch sensor. As showed in FIG. 4B, the analyzing module 146 records the edge information of each touch sensor. For example, the analyzing module 146 records an upper edge e, a bottom edge f, a left edge g and a right edge h of the touch sensor 411. Therefore, the analyzing module 411 knows that the covering area covering by the touch sensor 416 is the rectangular region formed by the upper edge e, the bottom edge f, the left edge g and the right edge h, and the opposite area is the non-covering area not covering by the touch sensor 416. As a result, the analyzing module 146 obtains a non-covering area non_c2 not covering by the touch sensors on the touch panel by jointing every non-covering area of each touch sensor after analyzing the edges of a plurality of the touch sensors.

Therefore, in the step S270, the extending module 148 generates at least one extending area by extending a covering area of the original sensor pattern to the non-covering area in order to obtain a final sensor pattern having at least one extending area. In other words, the extending module 148 generates the final sensor pattern having at least one extending area by changing the shape of the original sensor pattern, wherein the sensing area of the final sensor pattern on the touch panel is larger than the sensing area of the original sensor pattern on the touch panel.

More specifically, in an embodiment, the extending module 148 knows the range of the non-covering area according to the information provided by the analyzing module 146. Therefore, the extending module 148 changes the sensor pattern of the touch sensors directly according to the range of the non-covering area, or expands sensing area by adding an extending area from the outer edge of the original sensor pattern through further calculation. For example, the extending module 148 calculates the distance between the two adjacent touch sensors to determine the size of the extending area. In another embodiment, the extending module 148 calculates also the area of the non-covering area to determine the size of the extending area. In the case, the touch sensor adding the extending area expands the touch sensing area, so that the variation of sensing magnitude due to the contact operation of the user is sensed by more touch sensors.

Figure 5A:
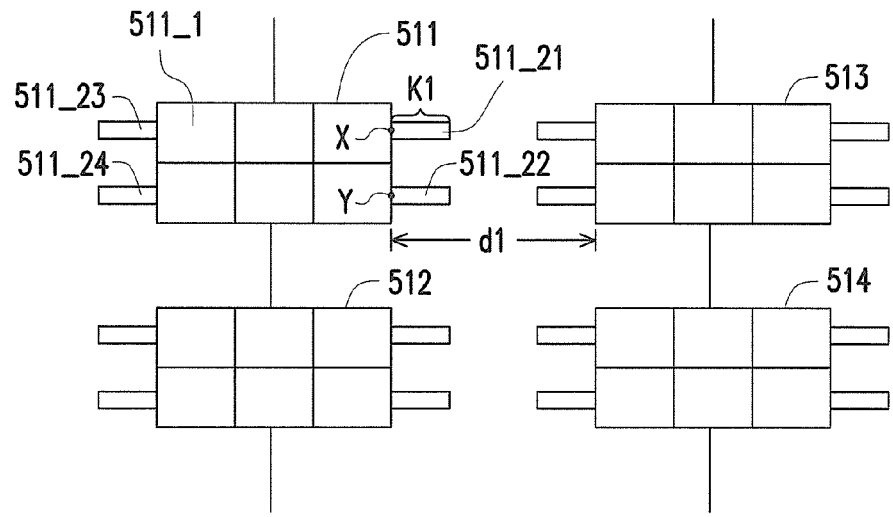
FIG. 5A is an example of a pattern adjusting method according to an embodiment of the invention.
Figure 5B:
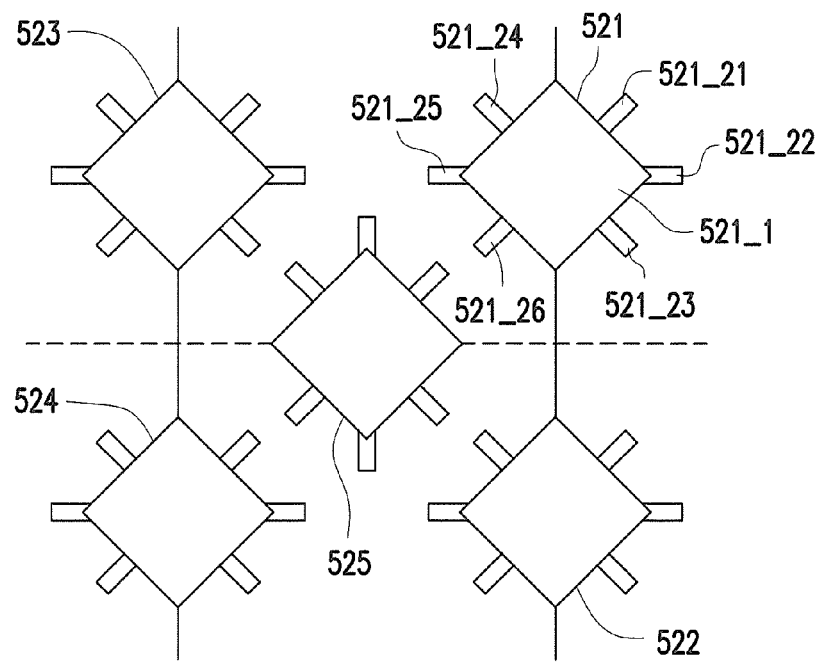
FIG. 5B is an example of a pattern adjusting method according to an embodiment of the invention.
Figure 5C:
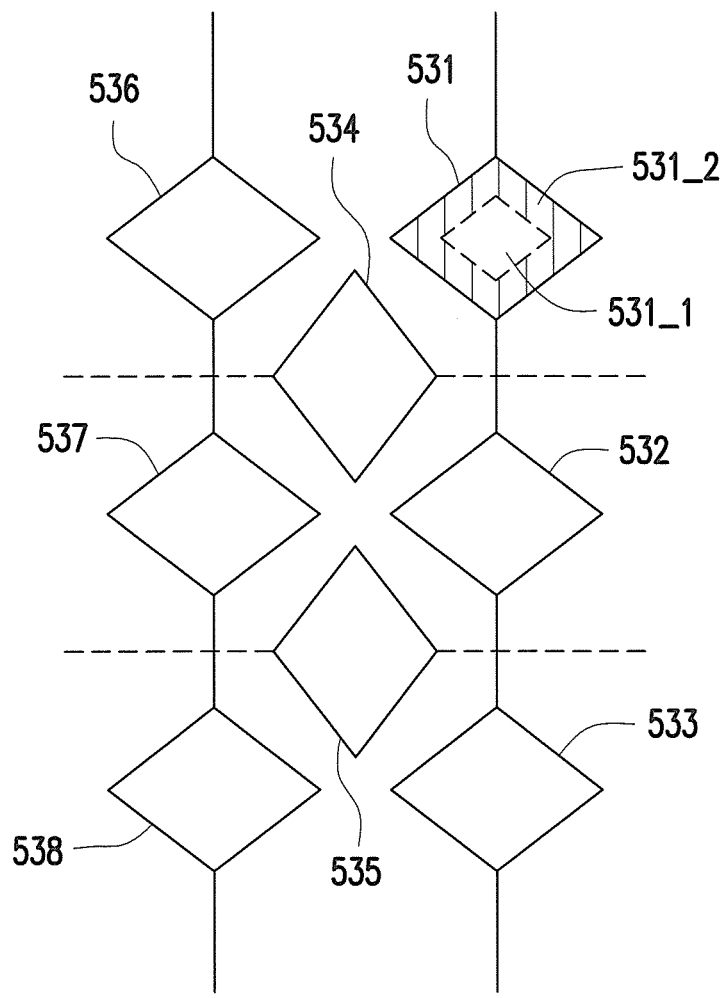
FIG. 5C is an example of a pattern adjusting method according to an embodiment of the invention.

For example, FIG. 5A to FIG. 5C are examples of a pattern adjusting method according to an embodiment of the invention. Please refer to FIG. 5A, in the example, the original sensor pattern is a rectangular pattern. The extending module 148 adds the extending areas 511_21 to 511_24 in a form of a line segment from the edge of the main area 511_1 of the original sensor pattern. In this way, the extending module 148 makes corresponding extending area of the touch sensor 511 to 514 cover the non-covering area according to the same method.

More specifically, the extending module 148 knows the spacing between the right edge of the touch sensor 511 and the left edge of the touch sensor 513 is d1 according to the information of non-covering area provided by the analyzing module 146. Therefore, the extending module 148 determines the extending length K1 of the extending area 511_21 to 511_24 and adds the extending area 511_21 at the position X and extending area 511_22 at the position Y on the right edge of the touch sensor 511. In the example, the position X and the position Y, for example, are equal-division points obtaining by equally dividing the length of the edge of the sensor, but the invention is not limited to it. Note that except extending the covering area of the original sensor pattern by automatic calculation, in another embodiment, the extending module 148 determines the length of the extending area by the command from the user.

Please refer to FIG. 5B, in the example, the original sensor pattern is a diamond pattern. The extending module 148 adds the extending areas 521_21 to 521_26 in a form of a line segment from the edge of the main area 521_1 of the original sensor pattern. Similarly, the extending module 148 determines the size and location of the extending area 521_21 according to the information of non-covering area provided by the analyzing module 146. In this way, the extending module 148 makes corresponding extending area of the touch sensor 521 to 525 cover the non-covering area according to the same method. Similarly, the extending module 148 determines the length of the extending area 511_21 by accepting the command from the user.

Besides, please refer to FIG. 5C, in the example, the original sensor pattern of each touch sensor 531 to 538 is a diamond pattern. The extending module 148 generates at least one extending area 531_2 by expanding a main area 531_1 of the original sensor pattern corresponding to the touch sensor 531 according to a scaling ratio so that the extending area of each touch sensor covers the non-covering area. More specifically, the extending module 148 determines the scaling ratio according to the size of the non-covering area and expands the original sensor pattern according to the scaling ratio. Similarly, in another embodiment, the extending module 148 determines the scaling ratio by accepting the command from the user.

Note that compared to the extending area showed in FIG. 5A and FIG. 5B, the extending area showed in FIG. 5C is not in a form of a line segment. Furthermore, the invention is not limited the shape of the extending area, and any extending area using for extending the original sensor pattern is belong to the scope of the invention. From above embodiments, expanding the sensing range of the final sensor pattern by adding extending area increases the overlap of the sensing area of each touch sensor. In other words, the method of the invention further adjusts the sensing range of the touch sensors according to the non-covering area, which is based on the original layout. In the case, it improves the accuracy of the touch sensing by avoiding judging the contact location through the sensing magnitude of one single sensor.

Back to the flow of FIG. 2, in step S290, the time determining module 149 determines if a charge time related to the final sensor pattern is larger than a threshold after determining the final sensor pattern. Note that the charging time of the sensor is one of the design factors of adjusting the final sensor pattern during the process of extending the original sensor pattern in the embodiment. The reason is that if the range of the final sensor pattern is too large, the charging time needed by the sensor is much longer. Once the charging time is too long, the sensing time of the sensor extends; then the user feels the lag of the response to the touch. Therefore, the extending module 148 generates at least one new extending area by extending again a covering area of the original sensor pattern to the non-covering area in order to obtain the final sensor pattern having at least one new extending area when the charging time is larger than the threshold.

To sum up, the invention increases the sensing range of one single touch sensor by extending the covering area of the touch sensor so that the overlap of sensing area of each touch sensor increases. Therefore, it is effective to position the contact location of the contact operation, and improves the positioning accuracy significantly. Besides, the invention broadens the sensing area of each touch sensor and reduces sensing area which is not sensed accurately without changing the number of the sensing channels of the touch control chip. In the case, it saves the manufacturing cost and the accuracy of the touch sensing is higher at the same time. Moreover, because the positioning accuracy of the contact point increases, it reduces the problem having a zigzag due to inaccuracy when the user applies drag operation to generate a linear segment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pattern adjusting method for determining a pattern of a plurality of touch sensors on a touch panel, the pattern adjusting method comprising:
    collecting panel information of the touch panel;
    generating an original layout result of the plurality of touch sensors according to the panel information and a predefined sensor information, wherein the predefined sensor information includes an original sensor pattern of each of the touch sensors, and the original sensor pattern comprises a shape of a sensing electrode of each of the touch sensors;
    obtaining a non-covering area of the plurality of touch sensors on the touch panel by analyzing the original layout result; and
    generating at least one extending area by extending a covering area of the original sensor pattern to the non-covering area in order to obtain a final sensor pattern having said at least one extending area,
    the step of generating said at least one extending area by extending the covering area of the original sensor pattern to the non-covering area in order to obtain the final sensor pattern having said at least one extending area comprising:
    generating the final sensor pattern having said at least one extending area by changing a shape of the original sensor pattern of each of the touch sensors, wherein a sensing area of the final sensor pattern on the touch panel is larger than a sensing area of the original sensor pattern on the touch panel.

2. The pattern adjusting method as claimed in claim 1, wherein the touch panel includes a touch region and a plurality of sensing channels, the plurality of touch sensors disposed on the plurality of sensing channels to form a plurality of sensing strings, and the panel information includes a dimension of the touch region and the number of the plurality of sensing channels.

3. The pattern adjusting method as claimed in claim 1, the step of generating the final sensor pattern having said at least one extending area by changing the shape of the original sensor pattern comprising:
    adding said at least one extending area in a form of a line segment from the edge of a main area of the original sensor pattern so that said at least one extending area of each of the touch sensors cover the non-covering area.

4. The pattern adjusting method as claimed in claim 1, the step of generating the final sensor pattern having said at least one extending area by changing the shape of the original sensor pattern comprising:

generating said at least one extending area by expanding a main area corresponding to the original sensor pattern according to a scaling ratio so that said at least one extending area of each of the touch sensors cover the non-covering area.

5. The pattern adjusting method as claimed in claim 1, wherein after the step of generating said at least one extending area by extending the covering area of the original sensor pattern to the non-covering area in order to obtain the final sensor pattern having said at least one extending area, the method further comprises:

determining if a charging time related to the final sensor pattern is larger than a threshold; and generating new said at least one extending area by extending again the covering area of the original sensor pattern to the non-covering area in order to obtain the final sensor pattern having new said at least one extending area when the charging time being larger than the threshold.

6. An electronic device for determining a sensor pattern of a plurality of touch sensors on a touch panel, the electronic device comprising:

a storage unit recording a plurality of modules; and one or a plurality of processing units coupling to the storage unit to access and execute the modules recorded in the storage unit, the modules comprising:

an information collecting module collecting panel information of the touch panel;

an original configuration module generating an original layout result of the plurality of touch sensors according to the panel information and a predefined sensor information, wherein the predefined sensor information includes an original sensor pattern of each of the touch sensors, and the original sensor pattern comprises a shape of a sensing electrode of each of the touch sensors;

an analyzing module obtaining a non-covering area of the plurality of touch sensors on the touch panel by analyzing the original layout result; and an extending module generating at least one extending area by extending a covering area of the original sensor pattern to the non-covering area in order to obtain a final sensor pattern having said at least one extending area, wherein the extending module generates the final sensor pattern having said at least one extending area by changing a shape of the original sensor pattern of each of the touch sensors, wherein a sensing area of the final sensor pattern on the touch panel is larger than a sensing area of the original sensor pattern on the touch panel.

7. The electronic device as claimed in claim 6, wherein the touch panel includes a touch region and a plurality of sensing channels, the plurality of touch sensors disposed on the plurality of sensing channels to form a plurality of sensing strings, the panel information including a dimension of the touch region and the number of the plurality of sensing channels.

8. The electronic device as claimed in claim 6, wherein the extending module adds said at least one extending area in a form of a line segment from the edge of a main area of the original sensor pattern so that said at least one extending area of each of the touch sensors cover the non-covering area.

9. The electronic device as claimed in claim 6, wherein the extending module generates said at least one extending area by expanding a main area corresponding to the original sensor pattern according to a scaling ratio so that said at least one extending area of each of the touch sensors cover the non-covering area.

10. The electronic device as claimed in claim 6, further comprising:

a time determining module determining if a charging time related to the final sensor pattern is larger than a threshold, wherein the extending module generates new said at least one extending area by extending again the covering area of the original sensor pattern to the non-covering area in order to obtain the final sensor pattern having new said at least one extending area when the charging time is larger than the threshold.

* * * * *